United States Patent [19]

Orlicki et al.

[11] Patent Number: 4,967,404
[45] Date of Patent: Oct. 30, 1990

[54] FOCUS/TRACKING SERVO AUTOMATIC GAIN CONTROL FOR OPTICAL RECORDING

[75] Inventors: David M. Orlicki, Rochester; William T. Fearnside, Fishers, both of N.Y.

[73] Assignee: Eastman Kodak Company, Rochester, N.Y.

[21] Appl. No.: 279,678

[22] Filed: Dec. 5, 1988

[51] Int. Cl.$^5$ .............................................. G11B 7/00
[52] U.S. Cl. .................................................. 369/44.11
[58] Field of Search .............. 250/201; 369/32, 43–47; 358/342

[56] References Cited

U.S. PATENT DOCUMENTS 4,471,477  9/1984  Bierhoff ............................... 369/46
4,751,695  6/1988  Kaku et al. .......................... 369/46

Primary Examiner—Robert L. Richardson

[57] ABSTRACT

In an optical recording system, automatic gain control circuitry is provided to maintain the gain of the focus (or tracking) servo system substantially constant and independent of intensity variations in the light beam used to detect focus (or tracking) error. According to a preferred embodiment, such circuitry comprises two cascaded stages, i.e., a switchable gain first stage for effecting coarse gain changes on command (e.g. when switching between write and read modes), and a non-linear feedback second stage for adjusting the coarsely trimmed output of the first stage to achieve overall constant focus (or tracking) error gain.

4 Claims, 2 Drawing Sheets

FOCUS/TRACKING SERVO AUTOMATIC GAIN CONTROL FOR OPTICAL RECORDING

BACKGROUND OF THE INVENTION

The present invention relates to the fields of optical and magneto-optical recording. More particularly, it relates to improvements in focus and/or tracking servo systems for maintaining a beam of radiation in sharp focus and/or at a desired location on a moving recording element (e.g. an optical or magneto-optical disk).

In the fields of optical and magneto-optical recording, many different schemes have been proposed and utilized for controlling the focus quality and tracking accuracy of a write/read laser beam on a spinning optical or magneto-optical disk. Such schemes typically employ a closely spaced and equi-sized pair (sometimes two pair) of photodetectors arranged to be irradiated by the beam after the beam has been reflected (or transmitted) by the disk. A lens serves to focus the reflected beam upon the detector pair and, depending upon the direction of mis-focus or mis-tracking of the write/read beam on the disk, one of the photodetectors is more exposed to the reflected beam than the other, i.e., a larger area of one of the detectors is irradiated. The respective outputs of the photodetectors are then subtracted (e.g. by a conventional differential amplifier) to derive an error signal which, for example, can be used to control the focal position of the objective lens used to initially focus the write/read beam on the disk. Such a servo system continuously strives to refocus or reposition the beam to minimize the error signal.

In conventional optical recording systems, the intensity of the beam reflected (or transmitted) by the recording element may vary over a range of 30 to 1. Such intensity variations result, in large part, from predictable changes in laser power, as occasioned by switching the optical head power between write and read modes. But sizable and non-predictable variations in reflected beam intensity can also result, for example, from optical noise in the laser cavity and unintentional reflectivity variations in the recording element. These intensity variations adversely effect the stability of the focus and tracking servo systems and, to the extent possible, should be normalized out of the photodetector output.

SUMMARY OF THE INVENTION

In view of the foregoing discussion, an object of this invention is to provide an automatic gain control circuit which renders the gain of focus or tracking servo systems of the type described insensitive to variations in the intensity of the beam used to irradiate the photodetectors.

According to a preferred embodiment, the automatic gain control circuit of the invention comprises a summing circuit for producing a control signal representing the sum of the respective output signals produced by a pair of photodetector elements of the servo system, and a variable impedance circuit which is responsive to such control signal for equally attenuating the respective photodetector output signals prior to summing by the summing circuit. By this feedback scheme, the sum of the photodetector outputs is maintained at a constant value (determined by a bias network), and any difference in servo system gain caused by intensity variations in the beam reflected from the recording element is normalized out (i.e. eliminated). Preferably, the automatic gain control circuit of the invention also includes a switchable gain stage for effecting a coarse gain adjustment on the photodetector outputs prior to summing to compensate for large gain variations, as will result from switching the beam intensity between write (high intensity) and read (low intensity) modes. Such a switchable gain stage serves to reduce the dynamic range of the signals with which the other stage must deal.

The invention and its advantages will be best understood from the ensuing detailed description of a preferred embodiment, reference being made to the accompanying drawings.

DETAILED DESCRIPTION OF PREFERRED EMBODIMENTS

Figure 1:
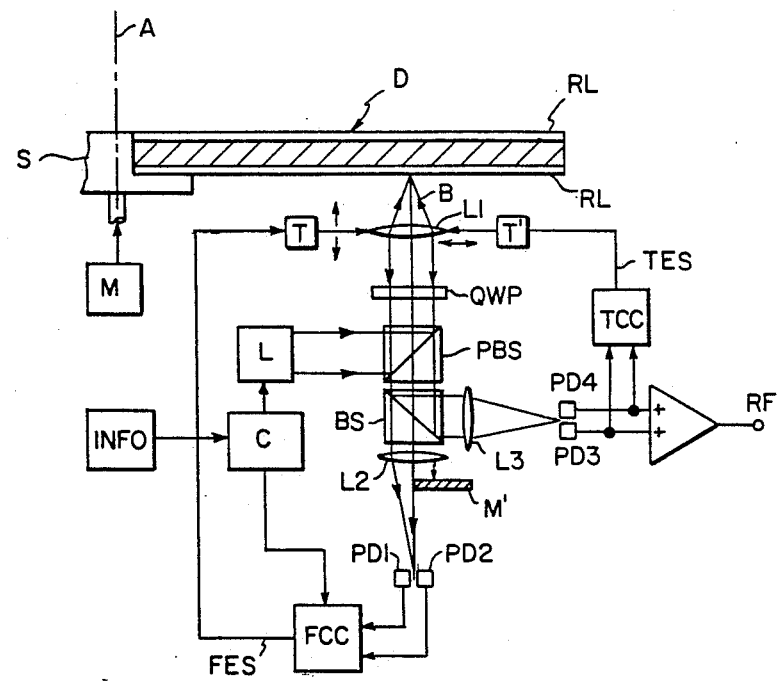
FIG. 1 is a schematic illustration of an optical recording system embodying the present invention.
Figure 2:
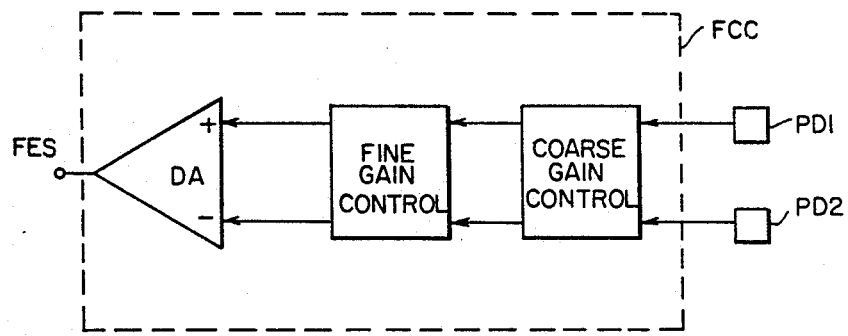
FIGS. 2-4 are increasingly more detailed circuit schematics of preferred circuitry for achieving automatic gain control.

Referring now to the drawings, FIG. 1 is a schematic illustration of an optical recording system in which a conventional optical disk D, mounted on a spindle S, is rotated at high velocity (e.g. 1800 rpm) about an axis by a drive motor M. As the disk rotates, information is either written or read on one of its recording layers RL by a focused beam B of radiation, as provided by a laser L. As shown, the laser output beam is reflected by a polarizing beam-splitter PBS, passes through a quarter-wave plate QWP and is focused on the disk's recording layer by an objective lens L1. When the system is operating in a "write" mode, the laser operates at relatively high power, a power sufficient, for example, to ablate the disk's recording layer. In the write mode, a controller C serves to intensity-modulate the laser beam intensity so that "pits" are formed in the recording layer. Such pits, of course, represent the data being written (i.e. recorded), such data being provided by an information source, INFO. When operating in a "read" mode, the laser operates on a continuous-wave (cw) basis at a substantially lower power, a power insufficient to produce ablation of the recording layer. Recovery of the recorded data is recovered in a conventional manner, as briefly described below.

To maintain the laser beam in sharp focus on a desired track on the recording element, focus and tracking servo systems are provided. The focus servo system illustrated in FIG. 1 is of the so-called "half-aperture" variety. It comprises a lens L2, a mask M which blocks one-half of the aperture of lens L2, and a pair of photodetectors PD1 and PD2. Operation of the focus servo is as follows: When disk D is in its nominal plane of rotation, radiation reflected from the disk's recording layer is imaged by lenses L1 and L2 to a spot located between photodetectors PD1 and PD2, each photodetector being irradiated equally. As the disk moves closer to lens L1, the image spot shifts to a plane which is rearward of the photodetectors along the optical axis. In this case, more of the radiation-sensitive surface of photodetector PD1 is exposed, there being a corresponding decrease in the irradiation of photodetector PD2. Similarly, as the disk moves from its nominal plane to a position further away from lens L1, a greater area of photodetector PD2 becomes irradiated by the focused spot, with a corresponding decrease in the irradiation of photodetector PD1. A differential amplifier comprising the focus control circuit FCC serves to difference the respective outputs of the photodetectors to provide a focus error signal FES which, when applied to a suitable transducer T, serves to reposition lens L1 to drive the error signal to zero.

In a very similar manner a tracking error signal TES can be derived from a second pair of photodetectors PD3 and PD4 to control the radial position of the read/write beam relative to the disk. In this case, a beam-splitter BS splits off a portion of the reflected beam and a lens L3 serves to focus the split beam to a spot located between (or equally irradiating) photodetectors PD3 and PD4. Radial movement of beam B on the disk causes one or the other of these photodetectors to receive more light, and a differential amplifier embodied in the tracking control circuit TCC produces the error signal by differencing the respective photodetector outputs. The data signal RF is recovered by summing the outputs of the photodetectors, as shown.

In the focus and tracking control systems described above, the photodetector outputs depend on both the intensity of the reflected beam and the size of the irradiated area of the photodetector. As noted earlier, intensity variations result, for example, from switching between write and read modes, from reflectivity variations in the recording element, or from noise-induced variations in the laser output power. These intensity variations provide no useful information insofar as focus condition or tracking accuracy are concerned. On the contrary, they serve only to add ambiguity and instability to the servo systems. Accordingly, it is desirable to provide some means for normalizing out the adverse effects of such intensity variations.

According to the present invention, there is provided an automatic gain control circuit (AGC) which, in systems of the type described, compensates for gain variations in the servo loop due to intensity variations in the reflected beam. (Incidentally, though the optical recording system described uses a reflection type recording element, it will be apparent that the invention has equal applicability to transmissive systems in which the read laser passes through the recording element and photodetectors monitor the amplitude and/or phase of the transmitted beam.) Preferably, the AGC circuit of the invention has two cascaded stages, one effecting a coarse gain control on the photodetector outputs, specifically to compensate for changes between write and read modes, and the other serving to finely adjust the coarsely trimmed output of the first stage to achieve overall constant error gain. The output of the fine gain control stage is fed to the differential amplifier DA normally used to difference the photodetector outputs to provide the focus error signal FES. (Hereinafter, the discussion will refer to a focus servo system, it being understood, of course, that the AGC circuitry can be used in any multichannel servo control system.

Figure 3:
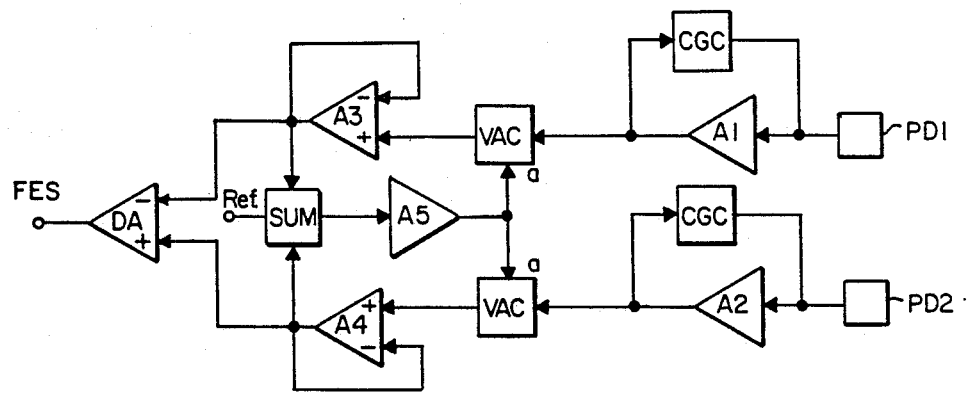
Figure 4:
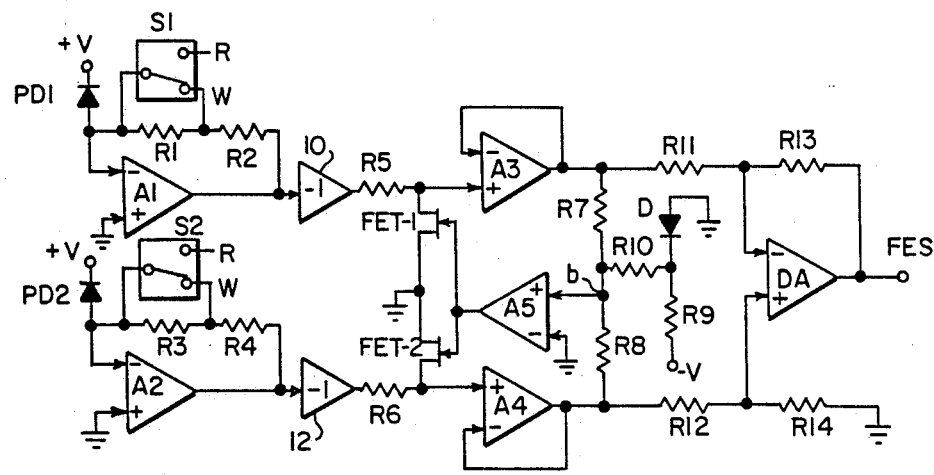

Referring now to FIG. 3 which is a block diagram of the circuit shown in FIG. 4, the respective outputs of photodetectors PD1 and PD2 are preamplified by amplifiers A1 and A2, respectively. A coarse gain control feedback circuit CGC serves to selectively attenuate the preamp inputs by either of two values, depending upon the write/read mode. The respective outputs of preamps A1 and A2 are passed through variable attenuation circuits which are matched to provide equal attenuation by an amount determined by an input signal a, applied to both circuits. The respective outputs of the attenuating circuits are then buffered by operational amplifiers A3 and A4, whose respective outputs are subtracted by differential amplifier DA to provide the focus error signal FES. In accordance with the primary feature of the invention, the respective outputs of buffering amplifiers A3 and A4 are summed by a summing network SUM in combination with amplifier A5 whose output provides the control signal a, for controlling the attenuation of the VAC circuits.

A more detailed electrical schematic of the FIG. 3 circuit is shown in FIG. 4, and the manner in which this circuit renders the gain of the servo system insensitive to intensity variations is as follows.

Photodiodes PD1 and PD2 detect radiation reflected off the disk. The current outputs of photododies PD1 and PD2 are amplified by transimpedance preamplifiers A1 and A2, respectively, to provide voltage outputs proportional to light intensity. The gain of the preamplifiers is determined by the state of solid state switches S1 and S2. In the write mode of the disk drive unit, when the laser is operating at high power, resistors R1 and R3 are shunted. This results in lower transimpedance gain, partially compensating for the higher optical gain of the channel. In the read mode, when the laser beam intensity is relatively low, resistors R1 and R3 are connected in series with resistors R2 and R4, respectively. The resulting higher electronic gain partially compensates for the lower optical throughput of the system. The switchable gain of the first stage transimpedance amplifiers can compensate for the predictable, gross changes in optical throughput of the system due to transitions between read and write modes, but cannot compensate for the unpredictable variations in throughput due to changes in disk reflectivity, laser power variations, etc.

Turning now to the non-linear feedback system which effects final gain control (FGC), inverting unity gain buffer 10, resistor R5, field-effect transistor FET-1 and buffer amplifier A3 form an inverting variable resistive attenuator stage when FET-1 is biased to operate at sufficiently low drain-to-source voltages. Buffer 12, resistor R6, field-effect transistor FET-2 and buffer amplifier A4 operate in the same fashion and, hence need not be described separately. The purpose of the two attenuators and associated control network comprising amplifier A5, diode D and resistors R7, R8, R9 and R10 is to regulate the gain of the two amplifier channels such that the gains are identical and the sum of the output voltages from amplifiers A3 and A4, as measured at point b, is constant.

With the objective lens near its best focus position, the sum of the photocurrents in diodes PD1 and PD2 depends only on the optical throughput of the recording system. Photocurrent difference is the product of focus position error and the photocurrent sum. By configuring the variable attenuators to maintain a constant sum at the outputs of A3 and A4, the amplified difference signal is proportional only to focus error, independent of optical throughput. With resistors R11 and R12 equal and resistor R13 and R14 equal, amplifier DA is configured as a difference amplifier. Its output FES is a measure of focus position error independent of optical throughput.

The mechanism by which the attenuation of the two channels is matched and results in a constant sum will now be described. Field-effect transistors FET-1 and FET-2 are a matched pair on a common substrate so that their characteristics track one another well over a wide range of environmental conditions. The FETs behave as identical but independent resistive elements with resistance determined by the gate voltage applied by amplifier A5. With zero volts applied to the gate, the FET assumes a minimum resistance, typically around 75 ohms. As the applied gate voltage becomes increasingly negative, the channel resistance of the FET increases asymptotically toward infinity. Therefore, with gate voltage near zero, the outputs of amplifiers A1 and A2 are heavily attenuated at the outputs of amplifiers A3 and A4, respectively. With highly negative gate voltages, the outputs of A1 and A2 appear nearly unattenuated at the outputs of A3 and A4, respectively. Diode D is biased to a cathode voltage of approximately −0.6 volts due to current drawn through resistor R9 to the negative power supply −V. Amplifier A5 is biased so that its output is strictly less than or equal to zero volts. Note that increasing radiation levels on photodiodes PD1 and PD2 result in increasingly positive voltages at the outputs of A3 and A4. This in turn drives the output of amplifier A5 less negative, resulting in greater and equal attenuation of the preamplified photodetector outputs at A3 and A4. On the other hand, a decrease in radiation level at the photodetectors results in more negative voltage at A3 and A4 so that the input to A5 tends to go more negative due to the bias network of resistor R9 and diode D acting through resistor R10. This decreases the gate voltage applied to the FETs and results in less attenuation of the preamplified signals. Note that the sum of the preamplified channel outputs is maintained constant. The feedback system described does not restrict the difference.

The invention has been described in detail with particular reference to preferred embodiments thereof, but it will be understood that variations and modifications can be effected within the spirit and scope of the invention.

From the foregoing description, it will be appreciated that AGC circuitry of the invention is adaptable for use in any multichannel circuit in which a common gain correction is required for all channels. The concept of summing the outputs of each channel and using, via a feedback loop, the summed output to equally attenuate the signal in each channel prior to summing serves to render the circuit insensitive to changes which equally affect the signal levels in each channel. The particular variable attenuation circuitry disclosed, i.e. a pair of FETs on a common substrate, is particularly advantageous in that it is insensitive to environmental changes which, but for such circuitry, could unevenly affect the attenuation in each channel. It will be appreciated that other attenuation circuit forms are possible that also take advantage of the good parameter tracking of electronic devices fabricated on a common substrate as disclosed in this example.

We claim:

1. In a recording system in which a focused beam of radiation is used to write and/or read information on a moving recording element, said recording system including a focus and/or tracking-control servo system for maintaining said beam in sharp focus on a desired portion of the recording element, said servo system comprising: (a) a pair of photodetectors positioned to be irradiated by the beam of radiation upon being reflected or transmitted by the recording element, each of said photodetectors being adapted to produce an electrical signal proportional to the intensity of irradiation received thereby, and (b) differential circuit means operatively coupled to said photodetectors for producing an error signal representing the focus and/or tracking condition of the radiation beam on the recording element, the improvement comprising:

automatic gain control circuitry for providing said servo system with a substantially constant gain that is substantially independent of variations in the intensity of irradiation received by said photodetectors, said automatic gain control circuitry comprising a summing circuit operatively coupled to the respective outputs of said photodetectors for producing a control signal representing the sum of said photodetector output signals, and a variable attenuator circuit operatively coupled to said photodetector outputs and responsive to said control signal for equally attenuating the respective outputs of said photodetectors prior to summing by said summing circuit, each photodetector output being attenuated by an amount proportional to said control signal.

2. The apparatus as defined by claim 1 wherein said variable attenuating circuit comprises a pair of field-effect transistors having their respective gate leads connected to said control signal.

3. The apparatus as defined by claim 2 wherein said transistors are a matched pair sharing a common substrate.

4. In a recording system in which a focused beam of radiation is used to write and/or read information on a moving recording element, said recording system including a focus and/or tracking-control servo system for maintaining said beam in sharp focus on a desired portion of the recording element, said servo system comprising: (a) a pair of photodetectors positioned to be irradiated by the beam of radiation upon being reflected or transmitted by the recording element, each of said photodetectors being adapted to produce an electrical signal proportional to the intensity of irradiation received thereby, and (b) differential circuit means operatively coupled to said photodetectors for producing an error signal representing the focus and/or tracking condition of the radiation beam on the recording element, the improvement comprising:

automatic gain control circuitry for providing said servo system with a substantially constant gain that is substantially independent of variations in the intensity of irradiation received by said photodetectors, said automatic gain control circuitry comprising: (a) a switchable gain stage including a pair of amplifiers for amplifying the respective outputs of said pair of photodetectors, and means for selectively varying the gain of each of said amplifiers by a predetermined value; and (b) a nonlinear feedback stage, operatively coupled to said switchable gain stage, for effecting final gain adjustment, said nonlinear feedback stage comprising a summing circuit operatively coupled to the respective outputs of said amplifiers for producing a control signal representing the sum of said amplifier output signals, and a variable attenuator circuit operatively coupled to said amplifier outputs and responsive to said control signal for equally attenuating the respective outputs of said amplifiers prior to summing by said summing circuit, each amplifier output being attenuated by an amount proportional to said control signal.

* * * * *